(12) United States Patent
Sato et al.

(10) Patent No.: US 6,976,755 B2
(45) Date of Patent: Dec. 20, 2005

(54) AQUEOUS INK, INK JET RECORDING METHOD, INK TANK RECORDING UNIT AND INK JET RECORDING APPARATUS

(75) Inventors: Shinichi Sato, Kanagawa (JP); Yuko Sato, Kanagawa (JP); Yuko Takada, Kanagawa (JP); Yoshihide Aikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/673,421

(22) Filed: Sep. 30, 2003

(65) Prior Publication Data

US 2004/0114014 A1 Jun. 17, 2004

(30) Foreign Application Priority Data

Oct. 2, 2002 (JP) .......... 2002-290217

(51) Int. Cl.[7] .......... B41J 2/01
(52) U.S. Cl. .......... 347/100; 347/95; 106/31.27
(58) Field of Search .......... 347/100, 95, 96, 347/101, 105; 106/31.27, 31.13; 540/145; 523/160; 428/195, 32.1

(56) References Cited

U.S. PATENT DOCUMENTS

| | | | |
|---|---|---|---|
| 4,198,203 A | 4/1980 | Groll et al. .......... | 8/7 |
| 4,282,000 A | 8/1981 | Groll et al. .......... | 8/527 |
| 4,853,036 A * | 8/1989 | Koike et al. .......... | 347/100 |
| 5,965,252 A * | 10/1999 | Santo et al. .......... | 428/32.32 |
| 6,174,355 B1 * | 1/2001 | Mayo et al. .......... | 106/31.27 |
| 2003/0164114 A1 | 9/2003 | Kitayama et al. .......... | 106/31.46 |

FOREIGN PATENT DOCUMENTS

| | | | |
|---|---|---|---|
| EP | 0 014 407 A1 | 8/1980 | |
| EP | 1 239 010 A1 | 9/2002 | |
| EP | 1239010 A1 * | 9/2002 | .......... C09D/11/00 |
| EP | 1 264 705 A1 | 12/2002 | |
| EP | 1 304 359 A1 | 4/2003 | |
| JP | 62-190273 A | 8/1987 | |
| JP | 7-138511 | 5/1995 | |
| JP | 7-138511 A | 5/1995 | |
| JP | 2002-105349 | 4/2002 | |

OTHER PUBLICATIONS

Patent Abstracts of Japan, vol. 1995, No. 8 (Sep. 29, 1995), with respect to JP 7–138511 A.

Patent Abstracts of Japan, vol. 012, No. 040 (C–474) (Feb. 5, 1988), with respect to JP 62–190273 A.

* cited by examiner

*Primary Examiner*—Manish S. Shah
(74) *Attorney, Agent, or Firm*—Fitzpatrick, Cella, Harper & Scinto

(57) ABSTRACT

An aqueous ink comprises a phthalocyanine dye represented by a general formula (I) and an aqueous medium, wherein the phthalocyanine dye does not contain a component of x+y=2 but at least contains components of x+y=3 and x+y=4, the content of the component of x+y=4 is larger than the content of the component of x+y=3, and the aqueous medium contains an amine compound having a vapor pressure of 0.01 mmHg or higher at 20–25° C.:

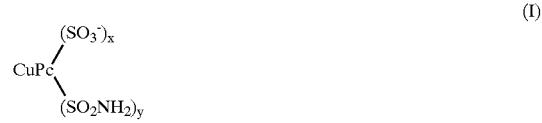

(I)

wherein CuPc represents a copper phthalocyanine residue; x represents 1, 2, 3 or 4 and y represent 0, 1, 2 or 3.

18 Claims, 5 Drawing Sheets

AQUEOUS INK, INK JET RECORDING METHOD, INK TANK RECORDING UNIT AND INK JET RECORDING APPARATUS

BACKGROUND OF THE INVENTION

1. Field of the Invention

The present invention relates to an ink, particularly to an ink jet recording ink, and more particularly to an aqueous ink providing an image improved in discoloration and fading resistance in an indoor environment, an ink jet recording method utilizing the same, and an ink tank, a recording unit and an ink jet recording apparatus to be used therein.

2. Related Background Art

Images obtained by the ink jet recording have acquired so fine an image quality as to be comparable with a silver halide photograph, a representative of high image quality. Recently, in addition to the original image quality, preservation of such a fine image for a long period of time without deterioration has become a major concern for the user. In view of a prolonged storage of an image, fading with light is a major problem which has been tackled by selecting dyes of high light fastness. For example, as a dye for a cyan color ink, C.I. Direct Blue 199 or C.I. Direct Blue 86 is now employed.

The ink jet print as a "photograph" is often displayed in an indoor environment. In such a case, discoloration may occur within a short period in spite of usage of dyes having excellent light fastness. Such fading or discoloration in the indoor environment is caused by environmental gasses such as ozone, nitrogen oxide, sulfur oxide etc. in the air. It proceeds even when the print is scarcely exposed to the light, and takes place within a relatively short period particularly with coated paper employing an inorganic pigment for the coating layer.

Such a drawback is not solved with conventional dyes such as C.I. Direct Blue 199 or C.I. Direct Blue 86 having a sulfon group or a sulfonamide group introduced into the copper phthalocyanine for water solubility. In order to improve the gas resistance, various methods have been proposed as patent applications, such as introduction of substituents into the copper phthalocyanine skeleton different from C.I. Direct Blue 199 etc., and employment of a dye of another skeleton in combination with the conventional dyes. For example, Japanese Patent Application Laid-open No. 2002-105349A discloses, as a cyan dye compound for an ink jet ink with an improved gas resistance, a mixture of compounds obtainable by chlorosulfonating a copper phthalocyanine and then amidating using 2.5 moles or more of an amidating agent to 1 mole of the starting copper phthalocyanine, represented by the following formula (II):

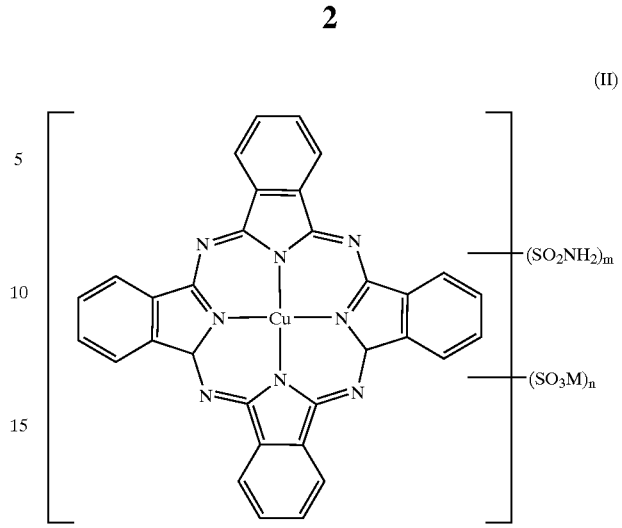

wherein M represents a proton, an alkali metal ion, an alkali earth metal ion, or an onium ion or an ammonium ion of an organic amine; m represents an integer from 1 to 4; n represents an integer from 1 to 3; and m+n is an integer from 1 to 4.

However, the present inventors have found that an ink jet ink containing such phthalocyanine dyes may reveal excellent gas resistance but have another drawback that an image formed with such an ink on a specific recording medium such as coating paper and glossy paper suffers from very poor water resistance and metallic luster called bronze phenomenon due to the coagulation of the dye on the recording medium.

SUMMARY OF THE INVENTION

In consideration of the foregoing, an object of the present invention is to provide a blue aqueous ink that can provide an image of high saturation, little fading or discoloration and excellent water resistance free from the bronze phenomenon.

Another object of the present invention is to provide an image recording method capable of forming an image of high saturation, little fading or discoloration and excellent water resistance.

According to the present invention, there is provided an aqueous ink including a phthalocyanine dye represented by the following formula (I) and an aqueous medium, wherein the phthalocyanine dye does not contain a component of x+y=2 but at least contains components of x+y=3 and x+y=4 in which the content of the component of x+y=4 is larger than the content of the component of x+y=3, and the aqueous medium contains an amine compound having a vapor pressure of 0.01 mmHg or higher at 20–25° C.

wherein CuPc represents a copper phthalocyanine residue; x represents 1, 2, 3 or 4 and y represent 0, 1, 2 or 3.

The present invention also provides an ink jet recording method utilizing the above-mentioned aqueous ink, and an ink tank, a recording unit and an ink jet recording apparatus to be employed therein.

DESCRIPTION OF THE PREFERRED EMBODIMENTS

Figure 1:
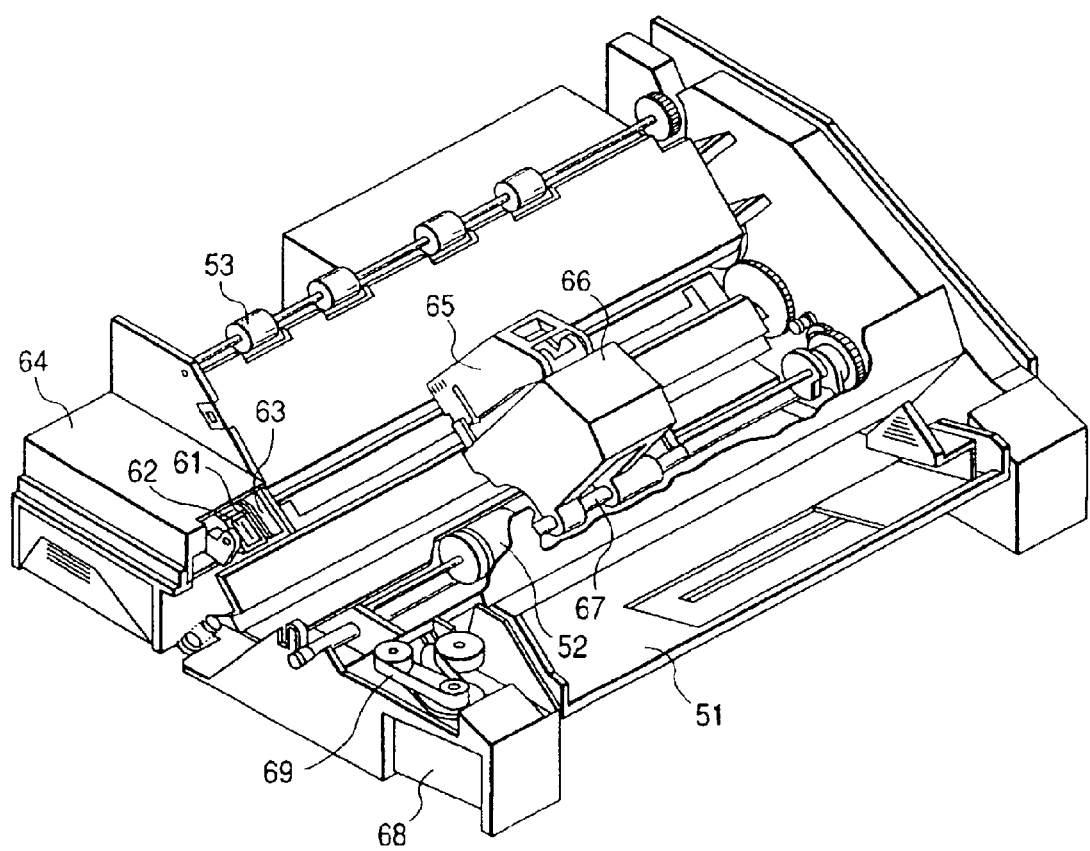
FIG. 1 is a perspective view showing an example of an ink jet recording apparatus.

According to the present invention employing a specific dye for a cyan ink and a specific compound for an aqueous medium, a print that shows little fading or discoloration in an indoor environment, and is excellent in water resistance and free from bronze phenomenon can be obtained.

A dye of the present invention represented by the formula (I) has a structure very close to that of a dye C.I. Direct Blue 199 in that a sulfonic acid and a sulfonamide are bonded to a copper phthalocyanine.

The present inventors investigated kinds and numbers of substituents of a copper phthalocyanine to find that disubstituted components participate in deterioration of water resistance of the image, and, in addition, that the ratio of $SO_3^-$ to $SO_2NH_2$ and properties of the solvent to be used have significant influence on gas resistance, water resistance and bronze phenomenon, which led to the present invention.

The aqueous ink of the present invention contains a phthalocyanine dye represented by the following general formula (I):

(I)

wherein CuPc represents a copper phthalocyanine residue; x represents 1, 2, 3 or 4 and y represents 0, 1, 2 or 3.

To include the aforementioned ion in the aqueous ink, it is preferable to add a phthalocyanine dye represented by the following formula:

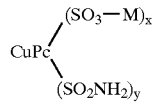

wherein CuPc represents a copper phthalocyanine residue; M represents an alkali metal (such as Li, Na, K, Rb, Cs or Fr) or ammonium; x represents 1, 2, 3 or 4; and y represents 0, 1, 2 or 3.

In the present invention, it is used a phthalocyanine dye that at least comprises compounds of the general formula I where x+y=3 and x+y=4 (components of x+y=3 and x+y=4 hereinafater) but does not contain the compounds of the general formula I where x+y=2 or less (component of x+y=2 hereinafter), wherein the content of the components of x+y=4 is larger than that of the component of x+y=3. In the present invention, "does not contain" means not only complete absence of the component but also substantial absence of the component, that is, it may be present in a trace amount so long as the effect of the invention can be obtained.

Also in the present invention, the component of x+y=4 is present in a larger amount than the component of x+y=3, which improves particularly the gas resistance. The ratio of the components can be determined from the peak height A of the component of x+y=4 and the peak height B of the component of x+y=3 obtained by analyzing the dye of the formula (I) by using high-speed liquid chromatography monitoring at a wavelength of 254 nm corresponding to benzene ring absorption. In the present invention, A/B preferably exceeds 1. Also excellent gas resistance is obtained in case A/B is equal to or larger than 1.5. Also in consideration of prevention of bronze phenomenon, the ratio A/B is preferably 9 or less, particularly preferably 4 or less.

Also in the present invention, the value y is preferably not less than 1 for suppressing the bronze phenomenon.

The aqueous ink of the present invention preferably has a dye concentration of 0.1 to 10 mass % with respect to the mass of the whole ink, more preferably 0.1 to 6 mass %. For printing of photographic quality, so-called photo inks (pale ink) of a lower dye concentration may be used in addition to ordinary inks, in order to reduce granularity in the highlighted portions. In such a case, the dye concentration of photo ink is preferably 0.1 to 2 mass % and that of ordinary ink is 2 to 6 mass %.

The phthalocyanine dye used in the present invention can be synthesized by conventional methods such as:

1) sulfonating a copper phthalocyanine with chlorosulfonic acid and then converting sulfonic acid into sulfonamide with ammonia; or 2) synthesizing copper phthalocyanine using sulfonated or sulfoamidated phthalic acid and phthalonitrile as starting materials and then sulfonamidating it if necessary.

Physical Properties of Ink

Physical properties of the ink are preferably controlled in consideration of ink jet adaptability. The ink preferably has a surface tension of 20 to 50 mN/m. The ink preferably has a viscosity of 1 to 5 mPa·s, more preferably 1 to 2.5 mPa·s. The ink preferably has a pH within a range of 6 to 10.5.

Aqueous Medium

In the present invention, the aqueous medium comprises water as a main component, and may contain a water-soluble organic solvent. In the present invention, the aqueous medium contains an amine compound of a vapor pressure of 0.01 mmHg or higher at 20–25° C., which significantly improves the water resistance of the gas-resistant image formed with the ink containing the aforementioned phthalocyanine dye. The mechanism of improvement in water resistance of the image due to the presence of such an amine compound is not yet clear, but is considered as follows. The amine compound controls the agglomeration conditions of the dye in the ink, especially of dyes as defined in the present invention, which can efficiently prevent the bronzing phenomenon due to dye aggregation after printing, or the deterioration of water-resistance caused by insufficient fixation of dye according to dye agglomeration state.

However, when the vapor pressure of the solvent is less than 0.01 mmHg at 20–25° C., or even lower at about 0.001 mmHg or less at 20–25° C., the solvent in the ink deposited on a print medium is considered to scarcely evaporate from the print.

Therefore, when the print medium absorbs moisture, for example, in a highly humid condition, the remaining amine solvent may interact with the dye to deteriorate the gas resistance. On the other hand, a solvent having a vapor pressure of 0.01 mmHg or higher at 20–25° C. will decrease with time by evaporation and would not cause deterioration in gas resistance. This is considered the reason why bronzing resistance and water resistance are improved while maintaining gas resistance even when the print is left in an air-exposed environment. This is particularly effective when the viscosity of the ink is controlled at 1 to 5 mPa·s, preferably 1 to 2.5 mPa·s.

The amine compound used in the present invention has preferably a vapor pressure 12 mmHg or lower at 20–25° C. If the vapor pressure is higher than that, volatility becomes too high to obtain sufficient solvent effect. Specific preferred examples of the amine compound having the vapor pressure of 0.01 mmHg or higher at 20–25° C. include 2-pyrrolidone, morpholine, mono-, di- and triethanolamine, and 2-pyrrolidone is particularly preferably in improving the water resistance of an image. A content of such an amine compound in the ink is 2 to 20 mass % with respect to the entire mass of the ink, preferably 4 to 10 mass %.

It is also preferable for the aqueous medium to include a glycol having a vapor pressure of 0.01 mmHg or higher at 20–25° C. in order to improve ink jet discharge properties of the ink, more specifically, so-called intermittent ink discharge property, i.e., ink discharge property when the ink ejection from a nozzle is interrupted for a while and thereafter re-started, without deteriorating the water resistance improving the effect of the addition of an amine compound of vapor pressure of 0.01 mmHg or higher at 20–25° C. to the ink. Such glycol can be for example ethylene glycol. The content of such glycol in the ink can be 2 to 20 mass %, preferably 3 to 10 mass %.

In the present invention, in consideration of discharge properties and suppression of bronze phenomenon, 2-pyrrolidone and ethylene glycol have a mass ratio (2-pyrrolidone:ethylene glycol) within a range from 1:2 to 2:1.

Table 1 shows vapor pressure of water-soluble organic solvents at 20 to 25° C. These data are obtained from Solvent Handbook 1st edition (published by Kodan-sha) and Solvent Pocket Book (published by Ohm-sha). For compounds for which the vapor pressure at 20–25° C. is not described in the above references, vapor pressure at 20 or 25° C. was calculated using the temperature-vapor pressure data in *Kagaku Binran Kiso-hen*, revised 3rd edition (published by Maruzen) according to the following equation derived from the Clapeyron-Clausius formula:

$$\ln P = -\Delta H vap / RT + C$$

(P: vapor pressure, ΔHvap: molar heat of evaporation (constant), R: gas constant, T: temperature, and C: constant).

In the present invention, "vapor pressure of 0.01 mmHg or higher at 20–25° C." means that the vapor pressure becomes 0.01 mmHg or higher at least at a temperature between 20 to 25° C., and it is not necessary that the vapor pressure is always 0.01 mmHg or higher in this temperature range. On the other hand, "vapor pressure of 12 mmHg or lower at 20–25° C." means that the vapor pressure does not exceed 12 mmHg in this temperature range of 20 to 25° C.

TABLE 1

| Solvent | Solvent Handbook Solvent Pocket Book (mmHg) | | calculated (mmHg) | |
|---|---|---|---|---|
| | 20° C. | 25° C. | 20° C. | 25° C. |
| 2-pyrrolidone | — | — | 0.02 | 0.03 |
| morpholine | 7.0 | 10.0 | — | — |
| diethanol amine | 0.01 | — | — | — |
| triethanol amine | 0.01 | — | — | — |
| ethylene glycol | 0.05 | 0.1 | 0.1 | 0.15 |
| diethylene glycol | <0.01 | — | 0.008 | 0.015 |
| glycerin | <0.001 | — | 0.0005 | 0.0008 |

Surfactant

The aqueous medium may further contain a known surfactant for controlling the surface tension. As such a surfactant, there is, for example, an anionic surfactant such as a fatty acid salt, a higher alcohol acid ester salt, an alkylbenzenesulfonate salt or a high alcohol phosphoric acid ester salt; a cationic surfactant such as an aliphatic amine salt or a quaternary ammonium salt; a nonionic surfactant such as a higher alcohol-ethylene oxide addition product, an alkylphenol-ethylene oxide addition product, an aliphatic ethylene oxide addition product, a polyhydric alcohol aliphatic ester-ethylene oxide addition product, an aliphatic amide-ethylene oxide addition product, a higher alkylamine-ethylene oxide addition product, a polypropylene glycol-ethylene oxide addition product, a fatty acid ester of a polyhydric alcohol, or a fatty acid amide of an alkanolamine; an amphoteric surfactant such as an amino acid type or betain type. Such a surfactant is not particularly limited but preferably employed is a nonionic surfactant such as a higher alcohol-ethylene oxide addition product, an alkylphenol-ethylene oxide addition product, an ethylene oxide-propylene oxide copolymer or an acetylene glycol-ethylene oxide addition product. Such ethylene oxide addition product preferably has a molar addition number within a range of 4 to 20.

In consideration of the matching with a print head and the printing properties on plain paper, it is desirable to employ a nonionic surfactant such as an ethylene oxide addition product of acetylene glycol.

Recording Method and Apparatus

Suitable for the present invention is an ink-jet recording system where heat energy geneterated in the recording head according to recording signals is applied to the ink to discharge ink droplets.

FIG. 1 illustrates an example of an ink-jet recording apparatus in which such a head as described above is incorporated. In FIG. 1, the blade 61 is a wiping member, one end of which is a fixed end held by a blade-holding member to cantilever. The blade 61 is provided at a position adjacent to a region in which a recording head 65 operates, and in this aspect, is held in such a form that it protrudes into the path of the recording head 65. Reference numeral 62 designates a cap for an ejection opening of the recording head 65, and the cap is arranged in a home position adjacent to the blade 61, moves in the direction perpendicular to the moving direction of the recording head 65, and caps the ink-ejecting opening when touching it. Numeral 63 designates an ink-absorber provided adjacent to the blade 61, which is held in the moving path of the recording head 65 in a projecting form like the blade 61.

The above blade 61, cap 62 and ink-absorber 63 constitute an ejection recovery part 64, and the blade 61 and the ink-absorber 63 serve to remove moisture and dust on the ink-ejecting opening. Reference numeral 65 designates a recording head. The head contains an energy generating means for ink ejection and performs recording by ejecting ink towards a recording medium opposite to the ink-ejecting opening. Numeral 66 designates a carriage for carrying the recording head 65 to move it. The carriage 66 is engaged with a guide shaft 67 in a slidable manner, and a part of the carriage 66 is connected to a belt 69 (not shown in the figure) driven by a motor 68. Thus the carriage 66 can move along the guide shaft 67, and the recording head 65 can move in the recording region and the region adjacent thereto.

Reference numeral 51 designates a recording medium feeding part for inserting a recording medium and numeral 52 designates a paper-delivery roller driven by a motor not shown in the figure. With such an arrangement, the recording medium is fed to the position opposite to the ink ejecting opening of the recording head 65 and conveyed to a paper output portion provided with a paper output roller 53 as recording proceeds.

In the above arrangement, while the recording head returns to its home position after recording, the cap 62 of the ejection recovery part 64 recedes from the moving path of the recording head, but the blade 61 is projecting in the moving path. As a result, the ink ejecting opening of the recording head 65 is wiped. When the cap 62 comes into contact with the ejection opening face of the recording head 65 to cap it, the cap 62 moves so as to protrude into the path of motion of the recording head 65.

When the recording head 65 is moved from its home position to the position at which recording is started, the cap 62 and the blade 61 are at the same positions as the wiping position as described above. As a result, the ejection opening of the recording head 65 is also wiped at the time of this movement. The above movement of the recording head 65 to its home position is made not only when the recording is completed or for ejection recovery, but also when the recording head 65 is moving in the recording region for recording, that is, it moves to the home position adjacent to the recording region at given intervals during recording, so as to wipe the ejection opening face with this movement.

Figure 2:
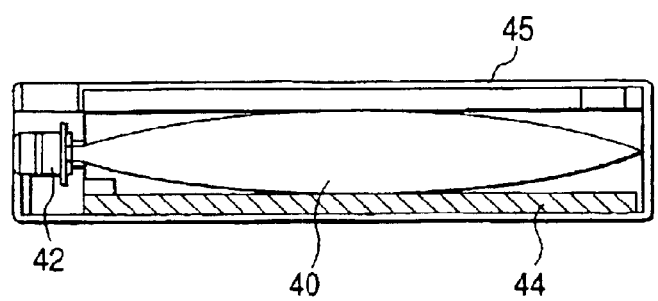
FIG. 2 is a longitudinal cross-sectional view of an ink cartridge.

FIG. 2 shows one example of an ink cartridge for storing ink for feeding ink to the recording head through an ink feeding member such as a tube. In the drawing, reference numeral 40 denotes a member constituting the ink cartridge 45, an ink storage portion such as an ink bag, whose tip is equipped with a rubber stopper 42. The ink in the ink bag 40 can be fed to the recording head by inserting a needle (not shown in the figure) into the stopper 42. Numeral 44 designate an ink absorber for receiving waste ink.

Figure 3:
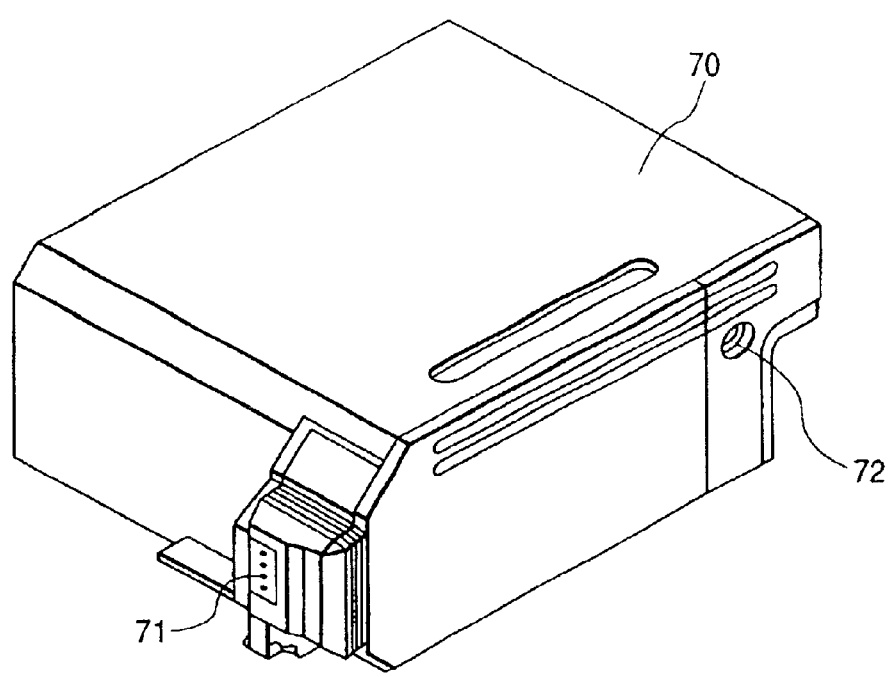
FIG. 3 is a perspective view of a recording unit.

The ink-jet recording apparatus used in the present invention is not limited to the apparatus as described above in which the head and the ink cartridge are separately provided. Therefore, a device in which these members are integrally formed as shown in FIG. 3 can also be preferably used. In FIG. 3, reference numeral 70 designates a recording unit containing an ink storing portion containing an ink, for example, an ink-absorbing member in it. The ink contained in the ink-absorbing member is ejected as an ink droplet from a head 71 having a plurality of orifices. Reference numeral 72 indicates an air passage for communicating the interior of the recording unit 70 with the atmosphere. This recording unit 70 can be used in place of the recording head 65 shown in FIG. 1, and detachably installed on the carriage 66.

Figure 4:
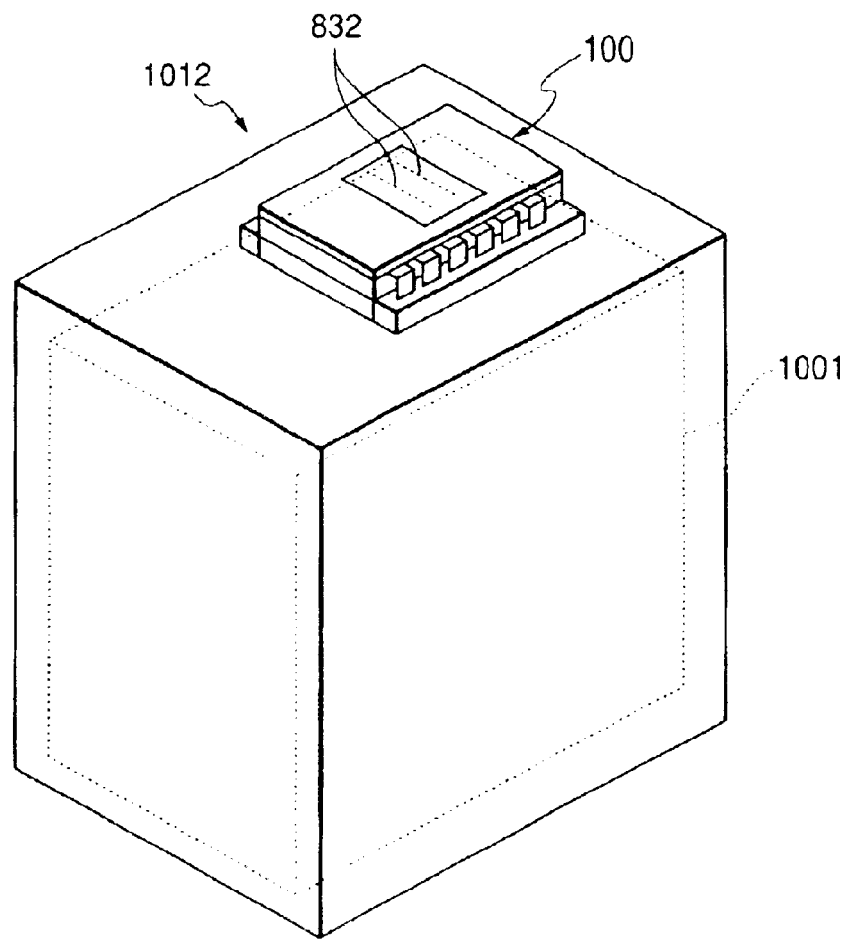
FIG. 4 is a schematic perspective view showing an example of an ink jet cartridge equipped with a liquid discharge head.

FIG. 4 shows one example of an ink jet cartridge that can be mounted on the above described ink jet recording apparatus. The cartridge 1012 in this example is a serial type cartridge, and the main section consists of an ink jet recording head 100 and a liquid tank 1001 for containing liquid such as ink.

In the ink jet recording head 100, a number of ejection orifices 832 for discharging the liquid are formed, and the liquid such as ink is arranged to be introduced to a common liquid chamber (not shown) of the liquid ejection head 100 through a liquid supply path not shown from a liquid tank 1001. The cartridge 1012 shown in FIG. 4 is a cartridge in which the ink jet recording head 100 and the liquid tank 1001 are integrally formed so that liquid may be supplied into the liquid tank 1001 if necessary, but it is also possible to adopt a structure where the liquid tank 1001 is exchangeably connected to this liquid ejection head 100.

Recording Medium

In the present invention, any recording medium can be employed as long as recording by ink deposition can be carried out.

The present invention is applicable to an ink-jet recording medium having a porous ink-receiving layer made of fine particles that adsorb a coloring material such as dye or pigment in the ink to form an image, especially by the ink jet system. Such recording medium for ink jet recording is preferably a so-called absorption type, in which an ink is absorbed by pores formed in an ink receiving layer on a substrate. An ink receiving layer of the absorption type is a porous layer mainly composed of fine particles containing a binder and other additives as necessary. Examples of the fine particles include an inorganic pigment such as silica, clay, talc, calcium carbonate, kaolin, an aluminum oxide such as alumina and alumina hydrate, diatomaceous earth, titanium oxide, hydrotalsite, and zinc oxide; and an organic pigment such as a urea-formalin resin, an ethylene resin, and a styrene resin. The above materials can be used singly or in combination. A binder advantageously employed is a water-soluble polymer or a latex such as polyvinyl alcohol or a modified product thereof, starch or a modified product thereof, gum arabic, a cellulose derivative such as carboxymethyl cellulose, hydroxyethyl cellulose or hydroxypropylmethyl cellulose; a vinyl copolymer latex such as SBR latex, NBR latex, methyl methacrylate-butadiene copolymer latex, a functionally modified polymer latex, or ethylene-vinyl acetate copolymer; polyvinylpyrrolidone, maleic anhydride or a copolymer thereof, an acrylate ester copolymer, and two or more kinds may be employed in combination if necessary. It is also possible to use additives, such as a dispersant, a thickener, a pH regulating agent, a lubricant, a fluidity modifying agent, a surfactant, a anti-foaming agent, a releasing agent, a fluorescent whitening agent, an ultraviolet absorber, an antioxidant etc. as necessary.

In particular, in the recording medium to be advantageously employed in the present invention, an ink receiving layer is formed by employing the aforementioned fine particles with an average particle size of 1 μm or less. The fine particles can preferably be those of silica or aluminum oxide. A representative example of preferred fine particles of silica is colloidal silica. The colloidal silica itself is commercially available, but particularly preferred examples are described in Japanese Patents Nos. 2803134 and 2881847. A preferred example of fine particles of aluminum oxide is fine particles of alumina hydrate. A preferred example of such alumina pigment is an alumina hydrate represented by a following general formula (III):

$$Al_2O_{3-n}(OH)_{2n} \cdot mH_2O \qquad (III)$$

In the formula (III), n represents an integer 1, 2 or 3; m represents a value of 0 to 10, preferably 1 to 5, but m and n do not become 0 at the same time. Since $mH_2O$ represents free water not involved in the formation of an $mH_2O$ crystal lattice, m can assume an integral or non-integral value. Also m may become 0 when such a material is heated. As the alumina hydrate, advantageously employed is a product obtained by a known method, such as hydrolysis of aluminum alkoxide or hydrolysis of sodium aluminate as described in U.S. Pat. Nos. 4,242,271 and 4,202,870 or neutralization of an aqueous solution of sodium aluminate etc. with an aqueous solution of sodium sulfate or aluminum chloride as described in Japanese Patent Publication No. 57-44605.

EXAMPLES

In the following, the present invention will be described further with Examples and Comparative Examples.

Examples 1–4 and Comparative Examples 1–2

Phthalocyanine dyes 1–3 to be employed in the present examples were prepared by a conventional method described above.

Figure 5:
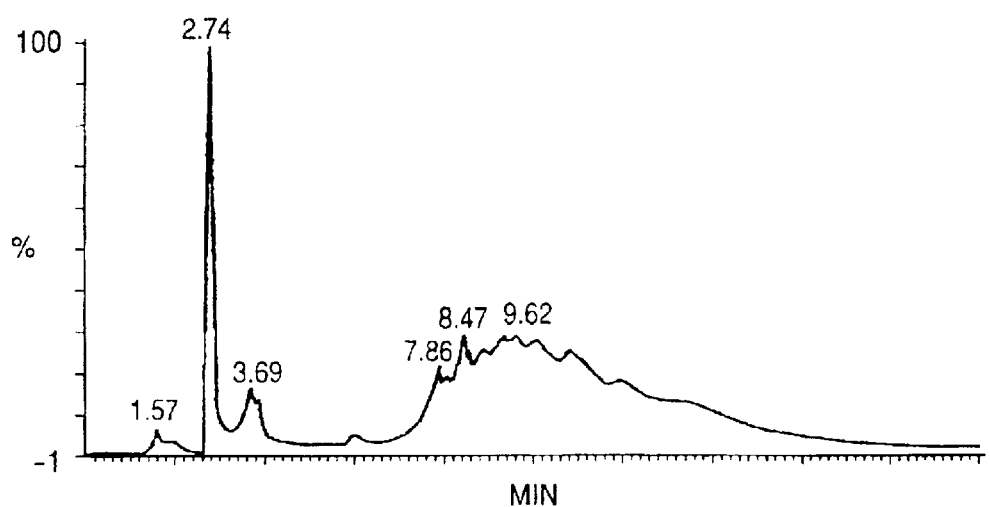
FIG. 5 is a chromatogram of dye 1.
Figure 6:
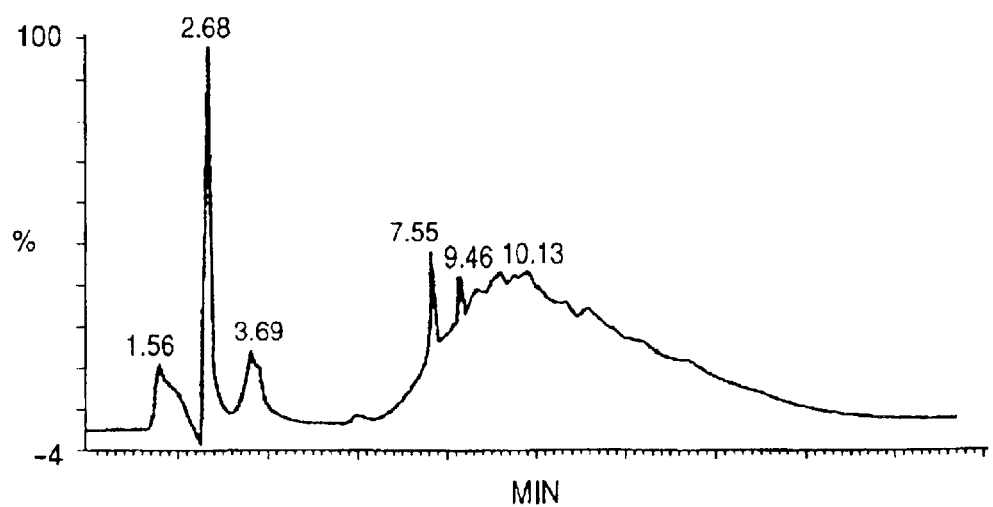
FIG. 6 is a chromatogram of dye 2.
Figure 7:
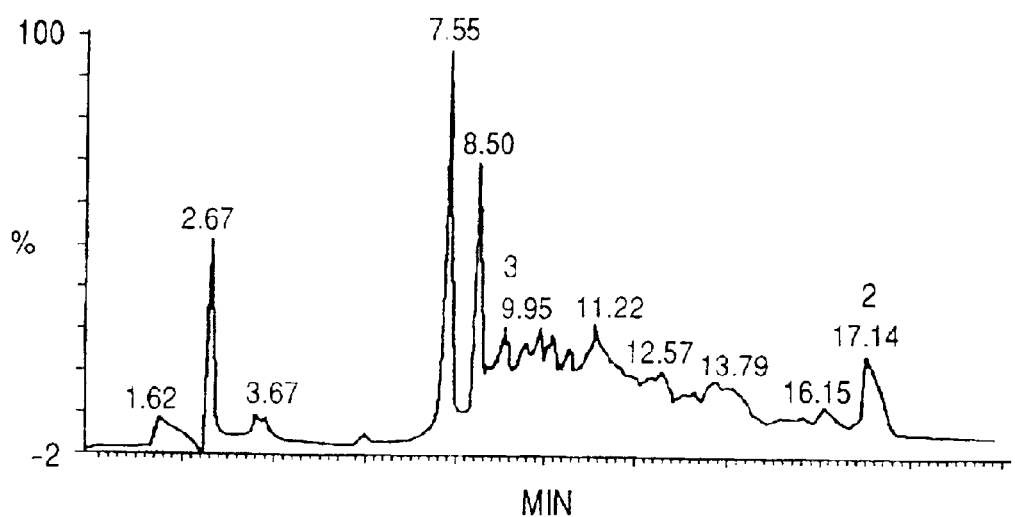
FIG. 7 is a chromatogram of dye 3.

The obtained dyes were analyzed by using a high-pressure liquid chromatograph-mass spectrometer (trade name: LC/MS, manufactured by Waters Inc.) with a column of Waters Symmetry C18, and analysis was done with a gradient of the moving phase of water/ammonium acetate/acetonitrile. FIGS. 5–7 respectively show chromatograms of the dyes 1–3.

Components were analyzed on the MS chart, by attributing $MH^+$ ions of 734–735 to the component of $x+y=2$, $MH^+$ ions of 814–816 to the component of $x+y=3$, and $MH^+$ ions of 894–896 to the component $x+y=4$.

Table 2 shows a result of such attribution. Also Table 3 shows analysis results of the dyes 1–3 employed in the Examples and the Comparative Examples, where $x+y$ is $x+y$ in the general formula (I), and each numeral indicates a sum of heights of the peaks in the liquid chromatogram.

TABLE 2

| Holding time | $MH^+$ value in MS | x + y |
|---|---|---|
| about 2.7 minutes | 895 | 4 |
| about 3.7 minutes | 895 | 4 |
| about 7.9 minutes | 815 | 3 |
| about 8.5 minutes | 815 | 3 |
| about 9.6 minutes | 815 | 3 |
| about 17 minutes | 735 | 2 |

TABLE 3

|  | Dye 1 | Dye 2 | Dye 3 |
|---|---|---|---|
| x + y = 4 | 88 | 88 | 45 |
| x + y = 3 | 38 | 62 | 126 |
| x + y = 2 | 0 | 0 | 15 |
| <u>x + y = 4</u> | 2.3 | 1.4 | 0.4 |
| x + y = 3 |  |  |  |

Cyan color inks were prepared by mixing components as shown in Table 4, where the components were dissolved with sufficient agitation, and the mixture was filtered under a pressure through a microfilter (manufactured by Fuji Photo Film Co.) of a pore size of 0.2 μm.

Each of the above-described inks was used in an ink jet recording apparatus BJF-870 (manufactured by Canon Inc.) equipped with an on-demand multi-recording head for discharging ink by applying thermal energy corresponding to recording signals to the ink, to obtain a print for evaluation.

For evaluating the gas resistance, there was employed a professional photo paper PR-101 (manufactured by Canon Inc.) having a coating layer of an inorganic pigment.

Items of evaluation were as follows.

1. Gas Resistance

A solid print of a duty ratio of 50% was exposed to an ozone concentration of 3 ppm for 2 hours, in an environment of a temperature of 45° C. and a relative humidity of 55%.

An evaluation was made according to a residual rate with respect to the initial optical density (OD). The OD was measured using a spectrophotometer (SPECTOLINO, a product of GRETAG).

A: residual rate is 80% or higher;
B: residual rate is 70% or higher but less than 80%;
C: residual rate is less than 70%.

2. Water Resistance

Cyan color bars were printed with a width of 3 mm and a gap of 3 mm, and 1.5 ml of tap water was poured on the print held at an angle of 45°. After drying, blotting of the color was observed visually:

A: no color blotting;
B: slight color blotting;
C: heavy color blotting.

3. Bronze Phenomenon

A solid cyan color patch of a duty ratio of 100% was printed in a 3 cm square, and the print was observed visually from the above or at an angle of 45° under a fluorescent lamp:

A: Print appears completely the same in any position;
C: A metallic luster was observed, or a color hue varied depending on the observation angle.

4. Ink Discharge Properties

Fine lines were printed intermittently in an environment of 15° C. and 10% RH, and the printing conditions were observed:

AA: Fine lines were formed without irregularity in the printing over a prolonged period;
A: Print irregularity was observed partly at the printing start positions after long intermission;
B: Ink discharge failed in a part of recording start positions after long intermission;
C: Many irregularities in printing were observed in printing start positions.

Results of evaluation are shown in Table 4. These results indicate that the inks of the present invention can provide an ink jet image realizing gas resistance and water resistance of the image at a high level, and also suppressing bronze phenomenon.

TABLE 4

|  | Ex. 1 | Ex. 2 | Ex. 3 | Ex. 4 | Comp. Ex. 1 | Comp. Ex. 2 |
|---|---|---|---|---|---|---|
| Dye |  |  |  |  |  |  |
| dye 1 | 4.5 | 4.5 | 4.5 | 4.5 |  | 4.5 |
| dye 3 |  |  |  |  | 4.5 |  |
| Solvent |  |  |  |  |  |  |
| glycerin | 8.0 | 8.0 | 8.0 | 8.0 | 8.0 | 15.0 |
| 2-pyrrolidone | 15.0 | 10.0 | 5.0 |  | 10.0 |  |
| urea | 7.0 | 7.0 | 7.0 | 7.0 | 7.0 | 7.0 |
| diethylene glycol | 5.0 | 5.0 | 10.0 | 5.0 | 5.0 | 5.0 |
| triethanol amine |  |  |  | 3.0 |  |  |
| isopropanol | 2.0 | 2.0 | 2.0 | 2.0 | 2.0 | 2.0 |
| acetylenol EH* | 0.8 | 0.8 | 0.8 | 0.8 | 0.8 | 0.8 |
| water | 62.2 | 67.2 | 67.2 | 74.2 | 67.2 | 72.2 |
| gas resistance | A | A | A | A | C | A |
| water resistance | A | A | A | A | A | C |
| bronze phenomenon | A | A | A | A | A | C |
| ink discharge property | B | A | A | B | A | A |
| ink viscosity | 2.6 | 2.3 | 2.3 | 2.0 | 2.3 | 2.2 |

*acetylenol EH: manufactured by Kawaken Chemicals, acetylene glycol-ethylene oxide addition product Examples 5–8

Cyan inks were prepared and evaluated in the same manner as in Example 1, except for employing an ink composition shown in Table 5. Results are shown in Table 5.

TABLE 5

|  | Ex. 5 | Ex. 6 | Ex. 7 | Ex. 8 |
| --- | --- | --- | --- | --- |
| Dye |  |  |  |  |
| dye 1 |  | 4.5 |  | 4.5 |
| dye 2 | 4.5 |  | 4.5 |  |
| Solvent |  |  |  |  |
| glycerin | 8.0 | 8.0 | 8.0 | 8.0 |
| 2-pyrrolidone | 10.0 | 5.0 | 6.5 | 3.5 |
| urea | 7.0 | 7.0 | 7.0 | 7.0 |
| diethylene glycol | 5.0 | 5.0 | 5.0 | 5.0 |
| ethylene glycol |  | 5.0 | 3.5 | 6.5 |
| isopropanol | 2.0 | 2.0 | 2.0 | 2.0 |
| acetylenol EH | 0.8 | 0.8 | 0.8 | 0.8 |
| water | 67.2 | 67.2 | 67.2 | 67.2 |
| gas resistance | B | A | B | A |
| water resistance | A | A | A | B |
| bronze phenomenon | A | A | A | A |
| ink discharge properties | A | AA | AA | AA |
| ink viscosity | 2.3 | 2.3 | 2.3 | 2.3 |

The results shown in Tables 4 and 5 indicate that the ink of the present invention can provide an ink jet image excellent in water resistance and bronzing resistance and also has especially excellent ink discharge properties, which ink does not contain copper phthalocyanine component of $x+y=2$ or less, and contains 2-pyrrolidone as an amine compound having a vapor pressure not less than 0.01 mmHg at 20–25° C. and ethylene glycol as a glycol having a vapor pressure not less than 0.01 mmHg at 20–25° C.

Comparative Examples 3–4

Cyan inks were prepared and evaluated in the same manner as in Example 1, except for employing phthalocyanine dyes 4 and 5 as shown in Table 6 and employing an ink composition shown in Table 7. Results are shown in Table 7. In Table 6, $x+y$ indicates $x+y$ in the general formula (I), and each numeral indicates a sum of the heights of the peaks in the liquid chromatogram.

TABLE 6

|  | Dye 4 | Dye 5 |
| --- | --- | --- |
| $x + y = 4$ | 0 | 100 |
| $x + y = 3$ | 95 | 0 |
| $x + y = 2$ | 10 | 0 |
| $\underline{x + y = 4}$ | 0.0 | — |
| $x + y = 3$ |  |  |

TABLE 7

|  | Comp. Ex. 3 | Comp. Ex. 4 |
| --- | --- | --- |
| Dye |  |  |
| dye 4 | 4.5 |  |
| dye 5 |  | 4.5 |
| Solvent |  |  |
| glycerin | 8.0 | 8.0 |
| 2-pyrrolidone | 10.0 | 10.0 |
| urea | 7.0 | 7.0 |
| diethylene glycol | 5.0 | 5.0 |
| triethanol amine |  |  |
| isopropanol | 2.0 | 2.0 |
| acetylenol EH | 0.8 | 0.8 |
| water | 67.2 | 67.2 |
| gas resistance | C | A |

TABLE 7-continued

|  | Comp. Ex. 3 | Comp. Ex. 4 |
| --- | --- | --- |
| water resistance | A | C |
| bronze phenomenon | A | C |
| ink discharge properties | A | B |
| ink viscosity | 2.3 | 2.3 |

As explained above, the present invention provides a cyan-colored ink that can provide images of high saturation and less fading or color change, particularly when recorded on a coated paper employing an inorganic pigment for the coating layer.

What is claimed is:

1. An aqueous ink comprising a phthalocyanine dye represented by a general formula (I) and an aqueous medium, wherein the phthalocyanine dye does not contain a component of $x+y=2$ but at least contains components of $x+y=3$ and $x+y=4$, a content of the component of $x+y=4$ is larger than a content of the component of $x+y=3$, and the aqueous medium contains an amine compound having a vapor pressure of 0.01 mmHg or higher at 20–25° C.:

(I)

wherein CuPc represents a copper phthalocyanine residue; x represents 1, 2, 3 or 4 and y represents 0, 1, 2 or 3.

2. The aqueous ink according to claim 1, wherein, in a high-pressure liquid chromatography analysis at a detection wavelength of 254 nm, a peak height A of a component of $x+y=4$ and a peak height B of a component of $x+y=3$ satisfy a relation $A/B>1$.

3. The aqueous ink according to claim 2, wherein A/B is 1.5 or higher.

4. The aqueous ink according to claim 1, wherein the amine compound is 2-pyrrolidone.

5. The aqueous ink according to claim 1, further comprising a glycol having a vapor pressure of 0.01 mmHg or higher at 20–25° C.

6. The aqueous ink according to claim 5, wherein the glycol is ethylene glycol.

7. The aqueous ink according to claim 1, wherein the ink is for ink jet recording.

8. The aqueous ink according to claim 1, wherein the ink has a viscosity within a range of 1 to 5 mPa·s.

9. The aqueous ink according to claim 8, wherein the ink has a viscosity within a range of 1 to 2.5 mPa·s.

10. The aqueous ink according to claim 1, wherein the amine compound has a vapor pressure of 12 mmHg or lower at 20–25° C.

11. An ink jet recording method comprising a step of discharging an aqueous ink onto a recording medium by an ink jet method, wherein the aqueous ink comprises a phthalocyanine dye represented by a general formula (I) and an aqueous medium, the phthalocyanine dye does not contain a component of $x+y=2$ but at least contains components of $x+y=3$ and $x+y=4$, a content of the component of $x+y=4$ is larger than a content of the component of $x+y=3$, and the aqueous medium contains an amine compound having a vapor pressure of 0.01 mmHg or higher at 20–25° C.:

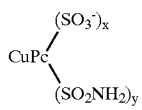

(I)

wherein CuPc represents a copper phthalocyanine residue; x represents 1, 2, 3 or 4 and y represents 0, 1, 2 or 3.

12. The ink jet recording method according to claim 11, wherein the recording medium has an ink receiving layer on a substrate.

13. The ink jet recording method according to claim 12, wherein the ink receiving layer contains a silica compound.

14. The ink jet recording method according to claim 12, wherein the ink receiving layer contains an alumina hydrate.

15. The ink jet recording method according to claim 14, wherein the alumina hydrate is represented by a following formula:

$Al_2O_{3-n}(OH)_{2n} \cdot mH_2O$ wherein n represents an integer 1, 2 or 3; m represents a value of 0 to 10, however m and n are not 0 at the same time.

16. An ink tank comprising an ink holding portion containing an aqueous ink, wherein the aqueous ink comprises a phthalocyanine dye represented by a general formula (I) and an aqueous medium, the phthalocyanine dye does not contain a component of x+y=2 but at least contains components of x+y=3 and x+y=4, a content of the component of x+y=4 is larger than a content of the component of x+y=3, and the aqueous medium contains an amine compound having a vapor pressure of 0.01 mmHg or higher at 20–25° C.:

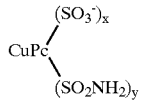

(I)

wherein CuPc represents a copper phthalocyanine residue; x represents 1, 2, 3 or 4 and y represents 0, 1, 2 or 3.

17. A recording unit comprising an aqueous ink and an ink jet recording head for discharging the aqueous ink, wherein the aqueous ink comprises a phthalocyanine dye represented by a general formula (I) and an aqueous medium, the phthalocyanine dye does not contain a component of x+y=2 but at least contains components of x+y=3 and x+y=4, a content of the component of x+y=4 is larger than a content of the component of x+y=3, and the aqueous medium contains an amine compound having a vapor pressure of 0.01 mmHg or higher at 20–25° C.:

wherein CuPc represents a copper phthalocyanine residue; x represents 1, 2, 3 or 4 and y represents 0, 1, 2 or 3.

18. An ink jet recording apparatus comprising an ink jet recording head for discharging an aqueous ink, wherein the aqueous ink comprises a phthalocyanine dye represented by a general formula (I) and an aqueous medium, the phthalocyanine dye does not contain a component of x+y=2 but at least contains components of x+y=3 and x+y=4, a content of the component of x+y=4 is larger than a content of the component of x+y=3, and the aqueous medium contains an amine compound having a vapor pressure of 0.01 mmHg or higher at 20–25° C.:

wherein CuPc represents a copper phthalocyanine residue; x represents 1, 2, 3 or 4 and y represents 0, 1, 2 or 3.

* * * * *

UNITED STATES PATENT AND TRADEMARK OFFICE
CERTIFICATE OF CORRECTION

| | |
|---|---|
| PATENT NO. | : 6,976,755 B2 |
| APPLICATION NO. | : 10/673421 |
| DATED | : December 20, 2005 |
| INVENTOR(S) | : Shinichi Sato et al. |

It is certified that error appears in the above-identified patent and that said Letters Patent is hereby corrected as shown below:

On the Title Page At [56], References Cited:

U.S. PATENT DOCUMENTS

| | | |
|---|---|---|
| Insert --5,451,251 | 09/1995 | Mafune et al. .................106/22H |
| 5,221,497 | 06/1993 | Watanabe et al. .............252/313.2 |
| 5,091,009 | 02/1992 | Nogami et al. ................106/287.1 |
| 4,248,852 | 02/1981 | Wakabayashi et al. ..........423/626 |
| 4,242,271 | 12/1980 | Weber et al. ..................260/448AD |
| 4,202,870 | 05/1980 | Weber et al. ..................423/630--. |

FOREIGN PATENT DOCUMENTS

| | | | |
|---|---|---|---|
| Insert --JP | 2881847 B2 | 04/1999 | |
| JP | 2803134 B2 | 09/1998 | |
| JP | 57-44605 B2 | 09/1982--. | |

Column 2

Line 59, "represent" should read --represents--.

Column 3

Line 58, "hereinafater" should read --hereinafter--.

UNITED STATES PATENT AND TRADEMARK OFFICE
CERTIFICATE OF CORRECTION

PATENT NO. : 6,976,755 B2
APPLICATION NO. : 10/673421
DATED : December 20, 2005
INVENTOR(S) : Shinichi Sato et al.

It is certified that error appears in the above-identified patent and that said Letters Patent is hereby corrected as shown below:

Column 4

Line 47, "considered" should read --considered to be--.

Column 6

Line 29, "geneterated" should read --generated--.

Column 7

Line 31, "designate" should read --designates--.

Signed and Sealed this

Ninth Day of January, 2007

JON W. DUDAS
*Director of the United States Patent and Trademark Office*